United States Patent [19]
Smith

[11] Patent Number: 5,394,790
[45] Date of Patent: Mar. 7, 1995

[54] APPARATUS FOR PREPARING AND PACKAGING POTATO CHIPS

[76] Inventor: J. Hudson P. Smith, P.O. Box 734, Kimberton, Pa. 19442

[21] Appl. No.: 290,587

[22] Filed: Aug. 15, 1994

[51] Int. Cl.⁶ .............................................. A47J 37/12
[52] U.S. Cl. ....................................... 99/407; 99/357; 99/409
[58] Field of Search ................. 99/336, 330, 403–410, 99/411–418, 357

[56] References Cited

U.S. PATENT DOCUMENTS

| | | | |
|---|---|---|---|
| 1,419,670 | 6/1922 | Geisendorfer | 99/357 |
| 3,975,070 | 8/1976 | Barteau et al. | 99/336 |
| 4,196,660 | 4/1980 | Steinberg | 99/357 |
| 4,270,598 | 6/1981 | Britton | 165/61 |
| 4,287,818 | 9/1981 | Moore et al. | 99/407 |
| 4,489,647 | 12/1984 | Stamps et al. | 99/336 |
| 4,505,194 | 3/1985 | Bishop et al. | 99/407 |
| 4,520,717 | 6/1985 | Bohrer, Jr. et al. | 99/411 |
| 4,539,898 | 9/1985 | Bishop et al. | 99/407 |
| 4,785,725 | 11/1988 | Tate et al. | 99/330 |
| 4,867,049 | 9/1989 | Johnson | 99/357 |
| 4,919,477 | 4/1990 | Bingham | 296/24.1 |
| 5,275,090 | 1/1994 | Connell | 99/357 |
| 5,307,736 | 5/1994 | Sorensen | 99/407 |
| 5,353,847 | 10/1994 | Cahlander et al. | 99/407 |

Primary Examiner—Timothy F. Simone
Attorney, Agent, or Firm—Dann, Dorfman, Herrell and Skillman; Henry H. Skillman

[57] ABSTRACT

A self-contained potato chip manufacturing system, which is automated and capable producing a high volume of potato chips. The system includes numerous components that are mounted in a container that can be transported. The components include a fryer, a system to remove the potato chips from the fryer, a machine to apply seasoning to the potato chips and a scale to weigh out portions of potato chips for each package. The components are permanently mounted in the container both for shipment and for operation when set up at a work site. The components are positioned on the floor of the container to allow work spaces within the container for operators to work at the various components.

15 Claims, 2 Drawing Sheets

APPARATUS FOR PREPARING AND PACKAGING POTATO CHIPS

FIELD OF THE INVENTION

The present invention relates to food preparation machinery and has particular application to apparatus for preparing and packaging potato chips.

BACKGROUND OF THE INVENTION

Potato chips are a food product that enjoys immense popularity around the world. Generally, potato chip manufacturers have two types of processes available to produce potato chips: high-capacity automated production system, and low-capacity manual production system.

A high-capacity automated production line uses numerous large machines. The machines are large so that they can process a large number of potato chips at once. Because the machinery is large, it requires a permanent building to accommodate it.

Most of the steps in such a system are automated and interconnected. An operator need only control the machines; the potato chips automatically flow from one processing step to the next, with minimal operator involvement. Such a system produces a high volume of potato chips that are packaged and ready for sale for present or future consumption. Because most of the potato chips are consumed in the future, the potato chips are packaged in a way that preserves their freshness so that they do not spoil in transit or while being stored before sale to the consumer.

A low-capacity manual production system relies on significant operator involvement. The machinery used is much smaller than that used in the high-capacity systems, and cannot produce a high volume of potato chips.

Each system has different applications. A high-capacity system is used when a manufacturer wants to produce a high volume of potato chips that can be sold on a wholesale and retail basis, such as in grocery stores. Because the number of consumers is large, the manufacturer can sell the high volume of potato chips that the system will produce, thereby recovering the investment in the large machinery. A low capacity system takes the production system to the consumers instead of simply sending the potato chips to the consumers. The equipment is small enough to be transported, so the manufacturer can deliver the system to a particular location. Once there, it can make the potato chips and dispense them to consumers for immediate consumption.

The present invention addresses problems that neither of these systems solve. Frequently a manufacturer desires to place a high-capacity production system at a particular location, but only temporarily. Because a high-capacity production system requires installation of the components in a building, the manufacturer cannot practically set up a high capacity system on a temporary basis. Additionally, in many locations, particularly in foreign countries, it is impossible or impractical to obtain a building permit for short-term use. If a manufacturer cannot build a building, then it cannot set up a high-capacity potato chip system.

SUMMARY OF THE INVENTION

The present invention is a self-contained, transportable potato chip factory. It allows potato chips to be produced on a commercial basis in places where it was previously impossible or impractical to do so.

The invention provides for the installation of the apparatus necessary to produce and package potato chips in a transportable unit which allows operation of the apparatus without the need for skilled operators to install and set up the apparatus.

More specifically, the present invention combines numerous commercial high-capacity machines used in making potato chips. These components are mounted in a container that serves not only as the shipping container, but also as the housing for the components, once the container has reached the production site. The principal components that are mounted in the container include a potato chip fryer, a device to remove the potato chips from the fryer, a bin to hold the cooked potato chips, a device to apply seasoning to the potato chips, and a device to weigh and package the potato chips.

In accordance with the invention, the components are adapted and positioned so that they are installed in proper production sequence within the container, and, at the same time, are positioned to provide work spaces within the container for the operators to work at the different components.

BRIEF DESCRIPTION OF THE DRAWINGS

The objects of the present invention are better understood when the following description is read in conjunction with the accompanying drawings, in which.

DESCRIPTION OF THE PREFERRED EMBODIMENTS

Figure 1:
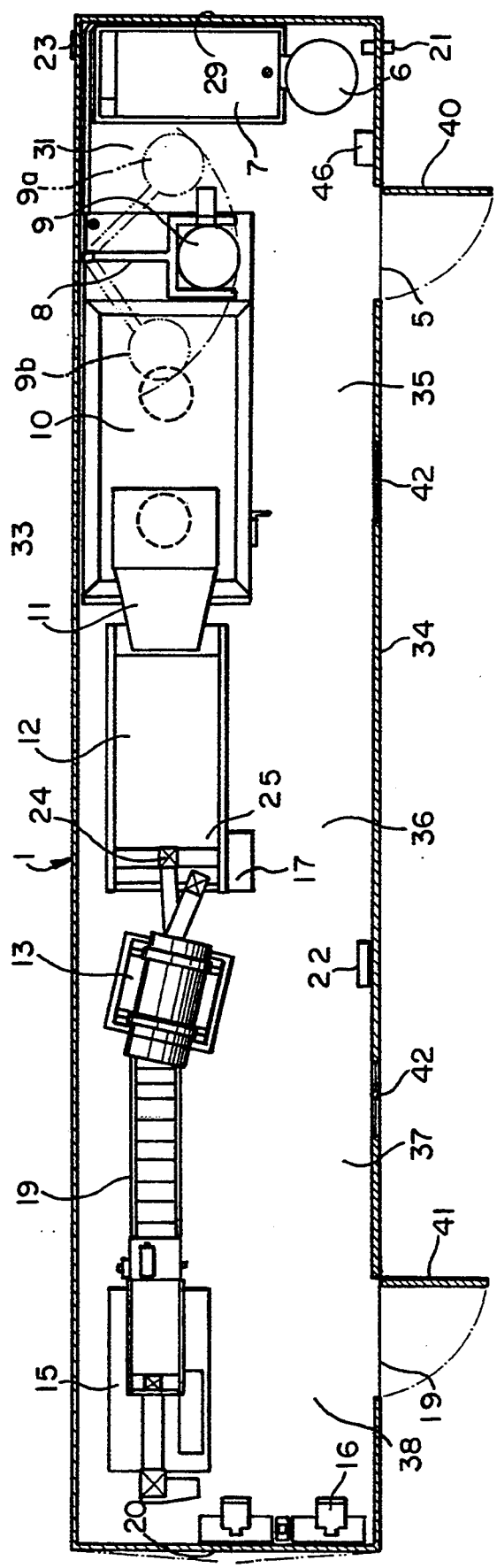
FIG. 1 is a diagrammatic plan view of a containerized potato chip production plant embodying the present invention, with the top wall of the container removed for the purposes of illustrating the layout of the various components of the production plant.
Figure 2:
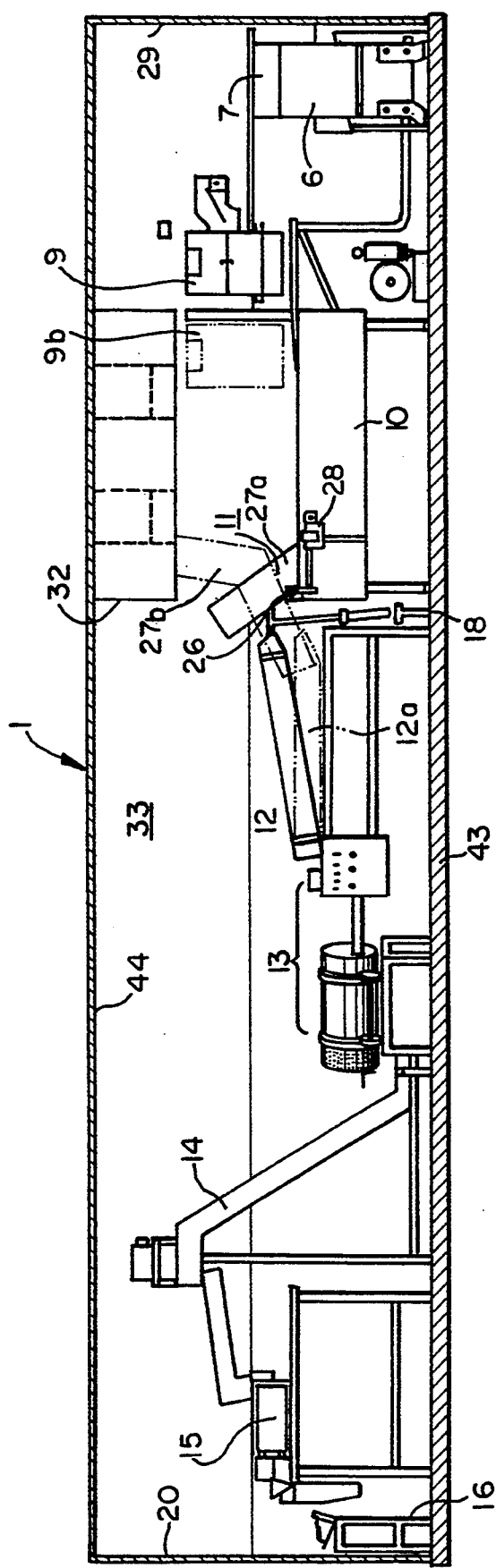
FIG. 2 is a side view of the container with a side wall removed to show the various elements within the container shown in FIG. 1.

Referring now to the drawings, there is shown a transportable container 1. Inside the container there is a potato peeler and washer 6, an inspection table 7, a slicer 9, a potato chip fryer for cooking the potato chips 10, a takeout means 11 for removing the potato chips from the fryer, a holding bin 12, a seasoning machine 13, an elevating conveyor 14 for transporting the potato chips from the seasoning machine to the weighing system 15, and a package sealer 16.

The apparatus produces potato chips in several steps. The potatoes are first cleaned at a washer and peeler 6. An operator then inspects the cleaned potatoes at an inspection table 7. The potatoes are loaded into a slicer 9 which slices the potatoes. The potato slices fall directly into a fryer 10, which cooks the potato chips. A takeout means 11 removes the potato chips from the fryer and places them into a holding bin 12. The potato chips then exit the holding bin 12 into a seasoning machine 13 which applies seasoning to the potato chips. From the seasoning machine 13, an elevating conveyor 14 transports the potato chips to a weighing and packaging means 15, where the potato chips are weighed, apportioned, and placed into packages. At the final step, an operator seals the packages in the package sealer 16.

The container 1 in which the components of the invention are mounted is a modified standard sea cargo container. Such containers are about 40 feet long and about 9 feet high and wide. While this particular container is preferred, other types of transportable containers may also be used. The container 1 is comprised of two vertical side walls 33 and 34, two vertical end walls 29 and 20, a horizontal floor 43, and a horizontal ceiling 44. Preferably, the major components of the apparatus are permanently mounted in the container 1, for example by being bolted or otherwise mounted on the floor 43 of the container 1, both for security while transporting the container to a work site and while they are set up and in operation at the work site.

The modified standard container has two openings in the front side wall 34, namely an access opening 5 and a discharge opening 19. The access opening 5 is located in the side wall 34 near the right end wall 29. The discharge opening 19 is preferably located on the same side wall 34, but near the left end wall 20. The left end wall 20 comprises a pair of hinged doors 20 which may be opened to allow full access through the entire end wall. As shown, the modified container has the openings 5 and 19 closed by doors 40 and 41, respectively, and the front wall 34 is equipped with windows 42.

In order to supply the components with electricity and water, inlet means for electricity 22, which may include an electrical circuit breaker, is mounted so that it may be connected to an external power source, for example on the front wall 34 between the openings 5 and 19 and an inlet means for water 23 mounted so that it may be connected to an external water supply, for example at the junction of the rear wall 33 and the end wall 29 of the container 1. The components are powered by electricity and/or compressed air. A compressor 46 is illustrated adjacent the access opening 5. Preferably, the compressor is mounted in the container so that it may optionally be positioned outside of the container when it is operating to supply compressed air to the components in the container that use compressed air. The compressor may be electrically powered from the electrical inlet, or may have a self-contained power supply. Each of the components that uses electricity is connected to the inlet means for electricity 22; and each of the components that uses water is connected to the inlet means for water 23. The components that use water are also connected to an effluent discharge control means 21 which is located for connection to an external waste line, for example near the juncture of the wall 29 with the front wall 34. The effluent discharge control means 21 allows the effluent to flow out of the container.

The potato chip production begins at the peeler and washer 6. The access opening 5 allows an operator working at the potato peeler and washer 6 to bring in potatoes from a source outside the container. The peeler and washer uses electricity and water, so it has connections (not shown) to the inlet means for electricity 22, the inlet means for water 23, and the discharge control means for effluent 21. The operator places potatoes into the peeler and washer 6, which cleans the potatoes by washing the potatoes with water and removing the potato skin. The potatoes are discharged from the peeler and washer 6 onto the inspection table 7, where an operator manually inspects the potatoes to ensure that they are thoroughly cleaned and have no significant defects. If the operator finds a defect, the operator can either use a knife to remove the defect from the potato or discard the entire potato.

The drying and inspection table 7 is positioned the right end wall 29 of the container 1, and is spaced a given distance away from the fryer 10. Positioned in this way, a work space 31 is created that allows an operator to stand in the floor 43 to work at the inspection table 7. The work space 31 extends along the full length of the inspection table 7 and has a depth corresponding to the distance between the fryer 10 and the table 7.

The potato slicer 9 is mounted at the right end of the fryer 10 on a movable mounting arm 8. The arm is pivotally mounted at the end of the fryer 10 to allow the slicer to be positioned either directly over the fryer 10 when it is slicing, or adjacent the inspection table 7 when it needs to be filled with potatoes.

To slice the potatoes, the operator moves the arm 8 on which the potato slicer 9 is mounted so that the slicer is adjacent the fryer 10 as indicated in broken lines at 9a. In this position, the slicer 9 is closer to the inspection table 7, to enable the operator to load the potatoes from the inspection table 7 into the slicer 9. Once the operator fills the slicer 9 with potatoes, the operator then moves the arm 8 so that the slicer is suspended over the hot oil in the fryer 10 as indicated in broken lines at 9b. The slicer 9 is supplied with electricity and/or compressed air through connections (not shown) to the electrical inlet means 22 and/or the compressor 46. The operator activates the slicer 9 which cuts the potatoes into slices which fall into the fryer 10.

When the container has been set in place at the work site, the fryer 10 is filled with a bath of cooking oil. In the present instance, the fryer uses natural gas or propane to heat the cooking oil to the temperature necessary to cook potato chips, and connections (not shown) are provided to a gas supply. The slices are discharged directly from the slicer 9 into the fryer 10, which has conventional controls to ensure that the cooking oil is maintained at the proper temperature. A hood 32 is mounted above the bath and is connected to an exhaust port in the container 1, which may be opened to the atmosphere during operation of the fryer.

The fryer 10 is positioned adjacent the rear side wall 33 of the container 1. The depth of the fryer 10 is less than the width of the container, so that a work space is created between the fryer 10 and the front wall 34 that allows an operator to stand on the floor 43 and work at the fryer. The work space 35 also allows an operator to perform routine maintenance on the fryer 10.

The takeout means 11 is mounted at the left end of the fryer 10, and has a scoop which is operated to lift the chips out of the bath of cooking oil in the fryer. A scoop actuator 26 with controls 28 pivots the scoop between a loading position within the fryer bath and discharge position beyond the left end of the fryer. While the potato chips are cooking in the fryer 10, the scoop is submerged in the hot oil as indicated in full lines at 27a. An operator monitors the cooking while the potato chips are in the fryer. Once the potato chips are finished cooking, the takeout system controls 28 are operated to remove the potato chips from the bath in the fryer 10. The scoop displacing means 26 raises the righthand segment of the scoop 27, which lifts the potato chips out of the fryer 10, as indicated in broken lines at 27b and drains the excess oil off the potato chips. The pivotal movement elevating the righthand segment of the scoop from the loading position laterally displaces the lefthand segment of the scoop to its discharge position. In the present instance, the takeout means 11 is powered by compressed air, and has connections (not shown) to the compressor 46.

The holding bin 12 is positioned at the left end of the fryer and receives the chips from the scoop 27 and allows them to cool before being transferred to the seasoning machine 13. While being held in the bin 12, the chips may be inspected. The bin has its right end elevated to facilitate transfer of the potatoes into the seasoning machine 13.

When the potato chips are cooling, the holding bin is elevated. When the next batch of chips is ready to be deposited into the bin, the right end of the bin is lowered. This permits the scoop 27 to be mounted for its pivotal movement at a lower point than would be required to deposit the chips on the elevated end of the bin 12. When the scoop 29 lifts the chips out of the fryer 10, the lifting means 18 lowers the holding bin 12 to the broken line position shown at 12a. The lifting means has connections (not shown) to the air compressor 46. The chips slide out of the scoop and onto the lowered end of the holding bin 12. After the scoop is emptied, it is pivoted from the discharge position shown at 27b into the loading position within the fryer 10 as indicated at 27a, and the bin is elevated to its normal position. While in the holding bin 12, an operator can manually inspect the potato chips so that any defective potato chips can be discarded.

Preferably, the takeout control means is coupled to the bin lifting device 18, so that the bin automatically is lowered when the scoop is actuated to remove the potato chips from the bath, and is automatically raised when the scoop is returned to the bath. In the container 1, there is limited working height between the floor 43 and the ceiling 44, and by lowering the feed end of the bin 12, there is ample clearance for operating the takeout scoop 27 within the working height in the container.

The holding bin 12 is located adjacent the left end of the fryer 10 to receive the potato chips as they exit the takeout means 11. The holding bin 12 is positioned adjacent the rear side wall 33 and the depth of the holding bin is less than the width of the container between the walls 33 and 34. In this way, a work space 36 is created that allows an operator to stand on the floor 43 and to work at the holding bin 12. The work space 36 also allows access to the seasoning control box 17, and allows an operator to perform routine maintenance on the controls for the holding bin 12.

The holding bin 12 has an exit opening 24 through which the potato chips pass into the seasoning machine 13. The seasoning machine has a drum which tumbles the chips to thoroughly season the chips, after the seasoning is applied to the chips in a control box 17. The control box 17 is below the exit opening 24 of the holding bin 12, to receive the potato chips as they exit the holding bin 12. A control means 25 is coupled between the holding bin and the seasoning machine, and monitors the supply of potato chips in the holding bin 12. If there are insufficient potato chips in the holding bin 12, then the control means 25 stops the seasoning machine 13 so that it does not run without a supply of potato chips.

The control box 17 applies the seasoning to the potato chips, and the drum tumbles the potato chips to cover them with the seasoning. An operator can also use the seasoning control box 17 to vary the amount or type of seasoning entering the seasoning machine according to the taste of the consumers. The seasoning machine 13 has connections (not shown) to the electrical inlet means 22 and/or the compressor 46.

The seasoning machine is also positioned adjacent the rear side wall 33 of the container 1. The width of the machine 13 is less than the width of the container so that a work space 37 is created that allows an operator monitor the seasoning machine 13. The work space 37 also allows an operator to perform routine maintenance on the seasoning means 13.

The potato chips are then either mechanically or manually transported to a weighing and packaging means 15. The preferred method utilizes an elevating conveyor 14 that mechanically transports the potato chips to the weighing and packaging means 15. The potato chips exit the seasoning machine 13 onto the elevator 14. The elevator 14 has a conveyor belt with cleats or flights which support the potato chips and prevent them from falling back as they are transported up to the receiver of the weighing and packaging machine 15. The elevating conveyor is connected to the air compressor 46 and/or the electrical inlet means 22 by suitable connections (not shown).

At this point, sufficient potato chips are weighed and apportioned for an individual package. The weighing and packaging means 15 is sufficiently accurate to allow an operator to consistently measure out a specified weight of potato chips. The preferred method uses an electronic scale that is sufficiently accurate and consistent to weigh out similar portions for each package of potato chips. If external power is needed, the scale has electrical connections (not shown) to the electric inlet means 22. Once a portion of potato chips is weighed, it is placed into a package, ready for sealing at 16 and boxing.

The weighing and packaging machine 15 is located adjacent the rear wall 33 of the container 1, and has a width substantially less than the width of the container. Positioned in this way, a work space 38 is created between the weighing station 15 and the front wall 34 of the container. The work space 38 allows an operator to stand on the floor 43 and work at the weighing and packaging machine 15. The work space 38 also allows an operator to perform routine maintenance on the weighing and packaging machine 15.

The packaged chips are then either mechanically or manually transported to a sealing means 16 temporarily or permanently mounted on the floor 43 along the left end wall 20. The sealing means 16 confronts the work space 38 so that an operator in the work space 38 may use the sealing means 16 to seal the packages of potato chips. The preferred sealing method uses heat and pressure to seal the package. The sealing means has electrical connections (not shown) to the electrical inlet means 22.

The sealing means 16 is preferably located between the weighing and packaging machine 15 and the discharge opening 19. Positioned in this way, an operator can seal the packaged potato chips and then transfer the packages to a holding container outside the container 1. The work spaces 35 to 38 provide temporary storage areas for the packaged products.

While a particular embodiment of the invention has been herein illustrated and described, it is not intended to limit the invention to such disclosures, but changes and modifications may be made therein and thereto within the scope of the following claims.

I claim:

1. A self-contained potato chip manufacturing apparatus comprising:

a transportable container having two side walls, two end walls, a floor and a ceiling, said side walls being spaced apart a given distance;

a potato chip fryer having a fryer width less than said given distance, positioned adjacent one of said side walls of said container, to provide a fryer work space having a width equal to the difference between said fryer width and said given distance;

a takeout means having a scoop mounted at one end of said fryer including means to displace said scoop to lift potato chips out of said fryer and drain the excess oil off the potato chips;

a holding bin having a bin width less than said given distance, having a feed end positioned adjacent said one end of said fryer to receive potato chips exiting said scoop, and positioned adjacent said side wall to provide a bin work space having a width equal to the difference between said bin width and said given distance;

a means for seasoning potato chips having a seasoning means width less than said given distance, positioned adjacent said holding bin and adjacent said side wall to provide a seasoning work space having a width equal to the difference between said seasoning means width and said given distance;

a means for weighing the potato chips having a weighing means width less than said given distance, positioned adjacent said seasoning means and adjacent said side wall to provide a weighing work space having a width equal to the difference between said weighing means width and said given distance.

2. The apparatus of claim 1 wherein one of said end walls extends transversely between said side walls and is spaced from the opposite end of said fryer, said container having an access opening in one of said side walls near said one end wall, further comprising a potato peeling and washing device positioned adjacent said one end wall and said access opening in said container so that an operator can access potatoes from a source outside said container.

3. The apparatus of claim 2 further comprising an inspection table having a table width less than the distance between said fryer and said end wall, positioned adjacent said potato peeler and washer and said one end wall to provide an inspection work space having a width equal to the difference between said table width and the spacing between said fryer and said end wall.

4. The apparatus of claim 3 further comprising a potato slicer and mounting means to mount said slicer above said fryer to allow discharge of sliced potatoes from said potato slicer into said fryer.

5. The apparatus of claim 4 wherein said mounting means comprises a movable arm mounting said potato slicer so that an operator can move said slicer toward said inspection table to access the potatoes on said inspection table.

6. The apparatus of claim 1 including a lifting device, said holding bin being mounted on said lifting device so that the feed end of said holding bin can be raised and lowered.

7. The apparatus of claim 6 including control means coupled to said scoop-displacing means and said lifting device, said control means being operable to lower the feed end of said bin upon displacement of said scoop out of said fryer and to raise said feed end upon return of said scoop into said fryer.

8. The apparatus of claim 1 further comprising means for packaging the potato chips, positioned adjacent said weighing means.

9. The apparatus of claim 8 wherein said container has a discharge opening adjacent said packaging means.

10. The apparatus of claim 1 wherein components of the apparatus use water, and further comprising water inlet means for supplying water to said water-using components.

11. The apparatus of claim 10 wherein components of the apparatus create effluent, and further comprising effluent discharge means for discharging the effluent created by said effluent-creating components.

12. The apparatus of claim 1 wherein components of the apparatus use electricity, and further comprising electrical inlet means for supplying electricity to said electricity-using components.

13. The apparatus of claim 1 wherein components of the apparatus use compressed air, and further comprising an air compressor for supplying compressed air to said compressed-air-using components.

14. The apparatus of claim 1 wherein components of the apparatus use compressed air, electricity and/or water and wherein selected components of the apparatus create effluent, further comprising electrical inlet means for supplying electricity to said electricity-using components, water inlet means for supplying water to said water-using components, and effluent discharge means for discharging the effluent created by said effluent-creating components, and a compressor for supplying compressed air to said air-using components and further comprising means for connecting the compressor, the electrical inlet, the water inlet, and the effluent discharge means to external utilities.

15. A self-contained potato chip manufacturing apparatus comprising:

a transportable container having a floor and a ceiling spaced apart to provide a working height;

a potato chip fryer on the floor of said container having a bath of cooking oil for frying the chips;

a takeout means having a scoop mounted at one end of said fryer for displacement between a loading position within said fryer bath, and a discharge position outside of said fryer bath, means to displace said scoop vertically from said loading position and laterally to said discharge position to lift fried potato chips out of said fryer and drain excess oil off the potato chips;

a holding bin having a feed end positioned adjacent to said one end of said fryer and operable to underlie the scoop when at its discharge position to receive potato chips exiting said scoop, a lifting device mounting said holding bin so that the feed end of said holding bin can be raised and lowered, control means coupled to said scoop-displacing means and said lifting device, said control means being operable to lower the feed end of said bin to a position underlying said discharge position of the scoop upon displacement of said scoop out of said fryer bath and to raise said feed end upon return of said scoop into said fryer bath, whereby the displacement of said scoop is effected within said working height.

* * * * *